United States Patent
Li et al.

(10) Patent No.: US 10,407,761 B2
(45) Date of Patent: Sep. 10, 2019

(54) STRENGTHENING LAYER ATTACHED TO CYLINDER BORE

(71) Applicant: GM GLOBAL TECHNOLOGY OPERATIONS LLC, Detroit, MI (US)

(72) Inventors: Huaxin Li, Rochester Hills, MI (US); Dale A Gerard, Bloomfield Hills, MI (US); Martin S Kramer, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 15/343,286

(22) Filed: Nov. 4, 2016

(65) Prior Publication Data

US 2018/0127861 A1    May 10, 2018

(51) Int. Cl.
| | |
|---|---|
| *C23C 4/02* | (2006.01) |
| *C23C 4/073* | (2016.01) |
| *C23C 4/16* | (2016.01) |
| *F02F 1/00* | (2006.01) |
| *B23K 101/04* | (2006.01) |
| *B23K 26/34* | (2014.01) |

(52) U.S. Cl.
CPC .............. *C23C 4/02* (2013.01); *C23C 4/073* (2016.01); *C23C 4/16* (2013.01); *F02F 1/00* (2013.01); *F02F 1/004* (2013.01); *B23K 26/34* (2013.01); *B23K 2101/04* (2018.08); *F02F 2200/00* (2013.01)

(58) Field of Classification Search
CPC .. C23C 4/02; C23C 4/16; C23C 4/073; C23C 4/12; F02F 1/004; F02F 2200/00; F02F 7/0012; F02F 1/18; B23K 26/34; B23K 2201/04; B23K 10/027; B23K 26/343

USPC .............................. 123/193, 668; 29/888.061
See application file for complete search history.

(56) References Cited

U.S. PATENT DOCUMENTS

| | | | |
|---|---|---|---|
| 8,877,285 B2 | 11/2014 | Silk et al. | |
| 2002/0073982 A1 | 6/2002 | Shaikh et al. | |
| 2007/0012175 A1* | 1/2007 | Miyamoto | B22D 19/0009 92/171.1 |
| 2012/0100313 A1* | 4/2012 | Colby | B23K 26/0823 427/591 |
| 2014/0137831 A1* | 5/2014 | Datta | F02F 1/18 123/193.2 |

(Continued)

FOREIGN PATENT DOCUMENTS

| | | | |
|---|---|---|---|
| EP | 2403972 B1 * | 8/2013 | ............... C23C 4/06 |
| EP | 2403972 B1 | 8/2013 | |

OTHER PUBLICATIONS

U.S. Application filed Jun. 16, 2016; U.S. Appl. No. 15/184,699, Applicant: GM Global Technology Operations LLC; Title: Surface Texture Providing Improved Thermal Spray Adhesion.

(Continued)

*Primary Examiner* — Joseph J Dallo
*Assistant Examiner* — Scott A Reinbold

(57) ABSTRACT

An engine block and a method of coating an inner surface of an engine cylinder bore of an engine cylinder are provided. The method includes attaching a strengthening layer or ring onto an upper portion of the inner surface of the cylinder bore. The strengthening layer or ring may be attached by laser cladding. The method also includes depositing a thermal spray coating onto the inner surface of the cylinder bore and the strengthening layer or ring.

9 Claims, 4 Drawing Sheets

(56) References Cited

U.S. PATENT DOCUMENTS

2015/0292432 A1* 10/2015 Stephenson ............... F02F 1/00
123/664
2016/0356242 A1 12/2016 Petrus et al.

OTHER PUBLICATIONS

U.S. Application filed Aug. 10, 2016; U.S. Appl. No. 15/233,254, Applicant: GM Global Technology Operations LLC; Title: Improved Adhesion of Thermal Spray Using Compression Technique.
U.S. Application filed Jun. 29, 2015; U.S. Appl. No. 14/753,152, Applicant: GM Global Technology Operations LLC; Title: Phosphating or Anodizing for Improved Bonding of Thermal Spray Coating on Engine Cylinder Bores.

* cited by examiner

STRENGTHENING LAYER ATTACHED TO CYLINDER BORE

FIELD

The present disclosure relates to engine blocks having a thermal spray coating deposited on inner surfaces of the cylinder bores and methods for coating the inner surfaces of the cylinder bores.

INTRODUCTION

Thermal spraying is a coating process which applies material heated and typically melted by combustion or an electrical plasma or arc to a substrate, such as a cylinder bore of an engine. The process is capable of rapidly applying a relatively thick coating over a large area relative to other coating processes such as electroplating, sputtering and physical and vapor deposition.

The ruggedness and durability of the thermal spray coating would seem to be almost exclusively a feature of the material of the coating and to a lesser extent the quality of application. However, it has been determined that, in fact, typically the most significant factor affecting the ruggedness and durability of a thermal spray coating is the strength of the bond between the thermal spray coating and the surface. A poor bond may allow the thermal spray coating to crack or peel off, sometimes in relatively large pieces, long before the thermal sprayed material has actually worn away, whereas a strong bond renders the thermal spray coating an integral and inseparable component of the underlying surface. Achieving a good bond between the thermal spray coating and the inner surface of the bore is one of the challenges that manufacturers face.

In addition, even if an acceptable bond is initially achieved, the thermal spray coating needs to be able to remain in workable condition over many engine cycles. However, the base material of the engine block and inner surfaces of the cylinder bores themselves may flex over time, particularly at the open ends of the cylinders and under high temperature conditions. Under such conditions, the thermal spray coating may crack or peel off, which may also decrease the life of the thermal spray coating on the cylinders.

For example, referring to FIG. 1A, a desired cylinder shape is illustrated, wherein the cylinder 5A has a substantially identical circumference at the base 6A and at the top 7A adjacent to the open end 8A. Referring to FIG. 1B, however, under high temperatures, a cylinder 5B formed of a material having a relatively low strength, such as aluminum, may become distorted. Thus, the cylinder 5B may end up with a much larger circumference at the top 7B near the open end 8B than at the bottom 6B of the cylinder 5B. This may result in cracking of the thermal spray coat attached to the cylinder 5B.

SUMMARY

The present disclosure provides a cylinder bore of an engine block having a strengthening layer or ring attached to the inner surface of the cylinder bore prior to applying the thermal spray coating, and an associated method for applying the strengthening layer and the thermal spray. The strengthening layer or ring may be added through laser cladding. The strengthening layer or ring may add strength at the open end of the cylinder to prevent deformation of the cylinder, and strengthening layer may also improve adhesion of the thermal spray coating.

In one form, which may be combined with or separate from the other forms disclosed herein, a method of coating an inner surface of an engine cylinder bore of an engine cylinder is provided. The method includes laser cladding a strengthening layer onto an upper portion of the inner surface of the engine cylinder bore. The method further includes depositing a thermal spray coating onto the inner surface of the engine cylinder bore such that a substantial entirety of a piston travel path on the inner surface is covered by the thermal spray coating.

In another form, which may be combined with or separate from the other forms disclosed herein, a method of coating an inner surface of an engine cylinder bore of an engine cylinder is provided. The method includes attaching a strengthening layer onto an upper portion of the inner surface of the cylinder bore and depositing a thermal spray coating onto the inner surface of the cylinder bore. The thermal spray coating is deposited such that a substantial entirety of a piston travel path on the inner surface is covered by the thermal spray coating, and the thermal spray coating extends farther into the cylinder bore than the strengthening layer.

In yet another form, which may be combined with or separate from the other forms disclosed herein, an engine block is provided that includes a plurality of cylinders defining a plurality of cylinder bores. Each cylinder bore has an inner surface, and each inner surface has a strengthening ring laser clad onto an upper portion of the inner surface. A thermal spray coating is formed on the inner surface of each cylinder bore. The thermal spray coating is adhered to the inner surface and to the strengthening ring.

Additional features may be provided, such as: forming the strengthening layer from a nickel alloy containing a majority of nickel; forming the strengthening layer from at least one of the following: a nickel alloy, a copper alloy, and a steel alloy; the inner surface of the cylinder bore defining a piston travel path; attaching the strengthening layer entirely outside of the piston travel path at an open end of the cylinder; providing the strengthening layer having a thickness in the range of about 0.1 mm to about 0.4 mm; providing the strengthening layer having a height in the range of about 5 to about 50 mm; disposing the strengthening layer at a position overlapping with a chamfer extending from the open end of the cylinder; forming an upper groove in the upper portion of the inner surface; disposing the strengthening layer within the upper groove; forming the strengthening layer by laser cladding; and the engine block being formed of aluminum.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The drawings herein are schematic in nature and are not necessarily drawn to scale or representative of the distances or relationships between the elements shown.

DETAILED DESCRIPTION

The following description is merely exemplary in nature and is not intended to limit the present disclosure, application, or uses.

Figure 1A:
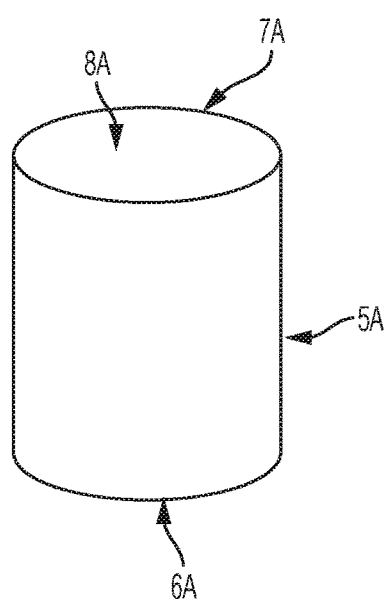
FIG. 1A is a schematic perspective view of an engine cylinder having a desired cylinder bore wall shape.
Figure 1B:
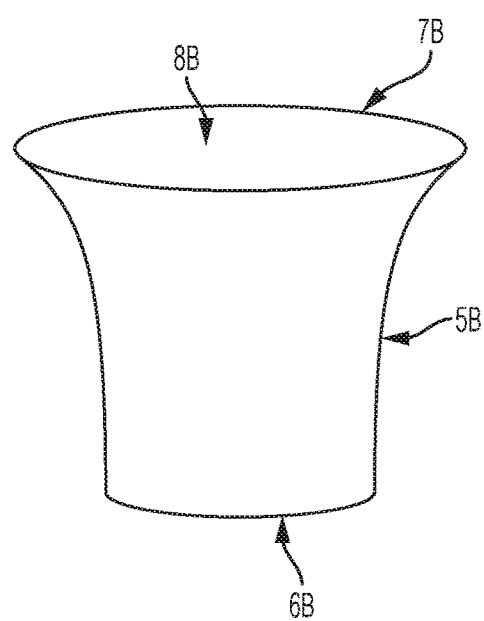
FIG. 1B is a schematic perspective view of another engine cylinder having a distorted cylinder bore wall shape with an enlarged open end.
Figure 2:
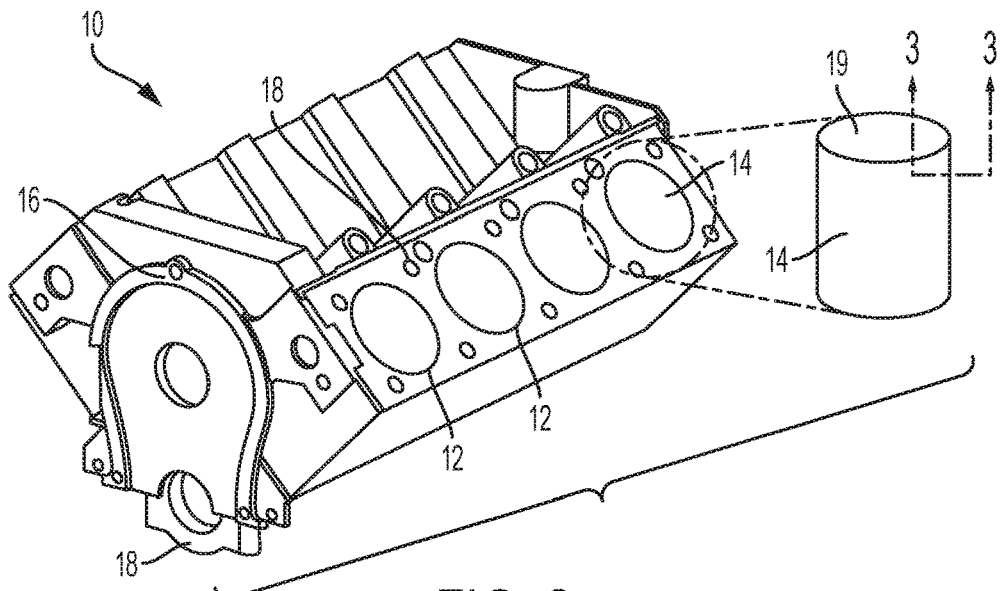
FIG. 2 is a schematic perspective view of an internal combustion engine block with an enlarged view of a cylinder bore wall of an engine cylinder, in accordance with the principles of the present disclosure.

With reference to FIG. 2, an internal combustion engine block is illustrated and generally designated by the reference number 10. The engine block 10 typically includes a plurality of cylinders 12 having interior cylinder bores 14, numerous flanges 16 and openings 18 for threaded fasteners, and other features for receiving and securing components such as cylinder heads, shafts, manifolds and covers (all not illustrated).

On the right side of FIG. 2 is an enlarged representation of the cylinder bore 14. The cylinder bore 14 may be a surface of a substrate such as an aluminum engine block 10 or a surface of an iron sleeve that has been installed in the engine block 10. Thus, the cylinder bore 14 has an inner surface wall 19. In either case, the surface finish of the inner surface 19 of the cylinder bore 14 may be a machined profile which is mechanically roughened or activated.

It will be appreciated that although illustrated in connection with the cylinder bore 14 of an internal combustion engine 10, with which it is especially beneficial, the present disclosure provides benefits and is equally and readily utilized with other cylindrical surfaces such as the walls of hydraulic cylinders and flat surfaces such as planar bearings which are exposed to sliding, frictional forces.

Figure 3:
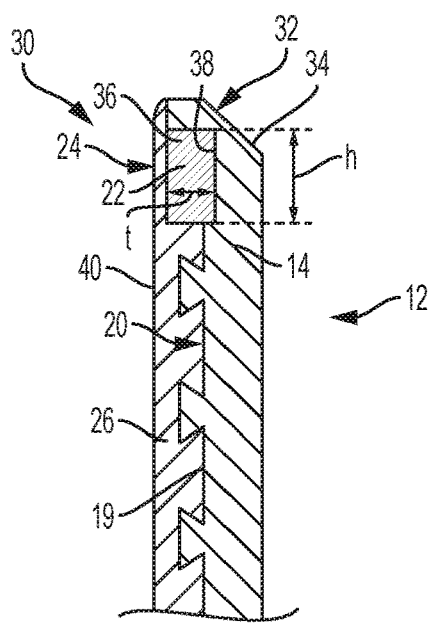
FIG. 3 is an enlarged schematic cross-sectional view of a portion of the cylinder bore wall having a strengthening layer and a thermal spray coating applied thereto, taken along line 3-3 of FIG. 2, according to the principles of the present disclosure.

Referring now to FIG. 3, an enlarged cross-section of a portion of the cylinder bore 14 schematically illustrates the surface texture 20 of the activated surface of the inner surface 19 of the cylinder bore 14. In this case, a dovetailed surface texture is illustrated, though it should be understood that other surface texturing could be used, or the surface texturing could be omitted, without falling beyond the spirit and scope of the present disclosure. In some examples, the surface texturing could have a depth of about 50 to about 250 µm, by way of example.

Figure 4:
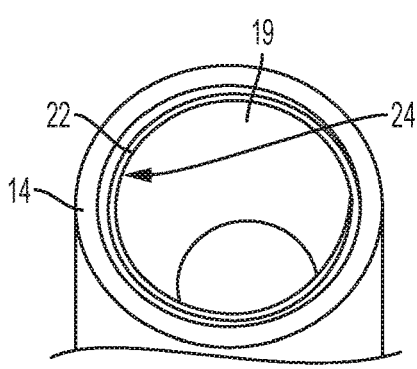
FIG. 4 is a perspective view of the cylinder bore wall of FIGS. 2-3 having the strengthening layer disposed on an upper portion of the cylinder bore wall prior to application of the thermal spray coating, in accordance with the principles of the present disclosure.

Referring to FIGS. 3 and 4, a strengthening layer 22 (having the shape of a ring) is attached to an upper portion 24 of the inner surface 19 of the cylinder bore 14. (FIG. 4 illustrates the cylinder 12 prior to application of a thermal spray coating 26, which illustrated only in FIGS. 3 and 5). The strengthening layer or ring 22 is preferably laser clad onto the inner surface 19 of the cylinder bore 14, though the strengthening layer 22 could alternatively be attached in another suitable way, such as through welding.

The strengthening layer 22 may be laser clad to the inner surface 19 using a laser beam resulting in a diffusion bond having atom sharing on both sides between the strengthening layer 22 and the inner surface 19 of the cylinder bore 14. Laser cladding may result in minimal dilution, cracking, and heat affected zones at the bond area between the strengthening layer 22 and the inner surface 19. Thus, a laser clad bond is formed between the strengthening layer 22 and the inner surface 19 of the cylinder bore 14. The strengthening layer 22 may add strength to the upper portion 24 of the cylinder bore 14, for example, by causing an increased high temperature creep strength that resists deformation, increased tensile and yield strengths, increased stiffness due to higher modulus of elasticity, and less thermal expansion of the cylinder wall 19 to control the cylinder 14 size and shape during operation.

The engine block 10, including the inner surfaces 19 of the cylinder bores 14 may be formed of aluminum, by way of example. The strengthening layer 22 is preferably formed of a high temperature alloy, such as a nickel alloy containing a majority of nickel, or a copper alloy, a stainless steel, or a low alloy steel, by way of example. The strengthening layer/ring 22 may have a thickness t in the range of about 0.1 mm to about 0.4 mm and a height h in the range of about 5 to about 50 mm, by way of example. In another variation, the height h may be in the range of about 10 to about 25 mm.

Figure 5:
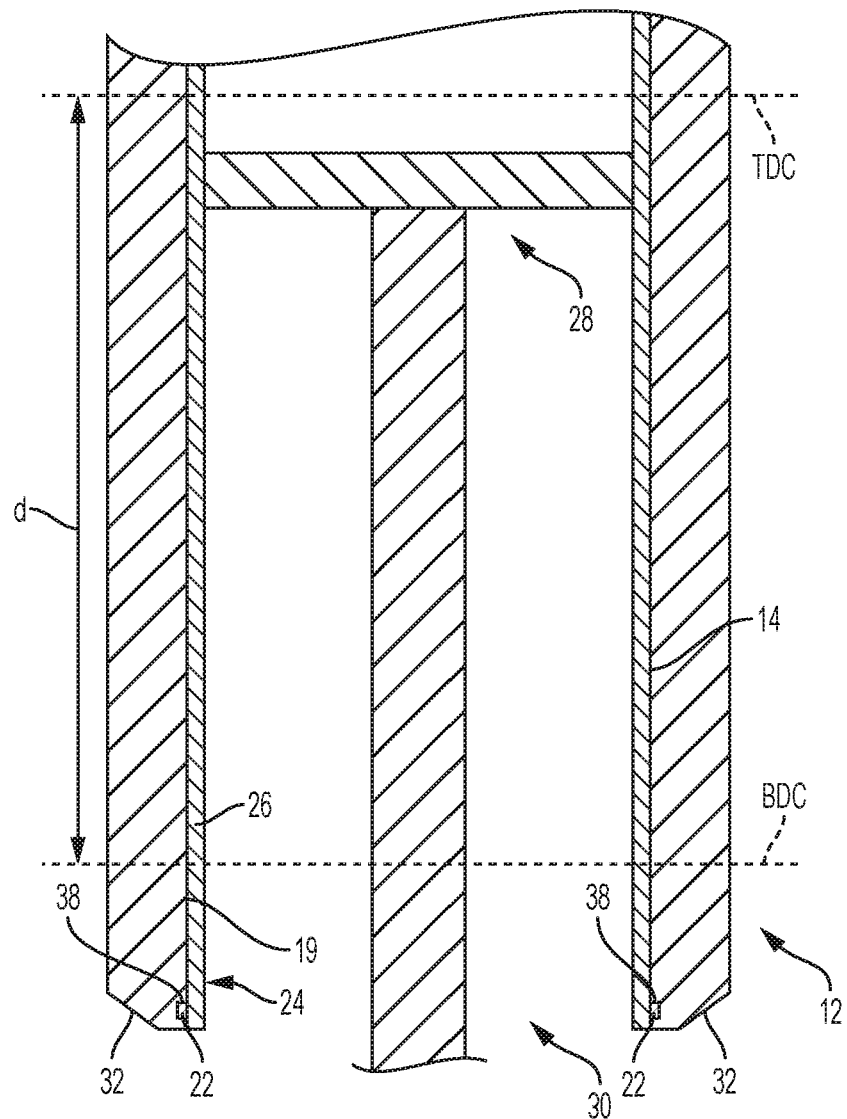
FIG. 5 is a cross-sectional view of the cylinder bore wall of FIGS. 2-4 showing a piston disposed in the engine cylinder, according to the principles of the present invention.

Referring to FIG. 5, each cylinder 12 has a piston 28 that is configured to move within the cylinder 12 by virtue of the engine crankshaft (not shown). One engine combustion cycle of one cylinder 12 may include four strokes: an intake stroke, a compression stroke, an expansion stroke, and an exhaust stroke. During the intake stroke, the piston 28 is lowered to a bottom most position, and air and fuel may be provided to the cylinder 12. The bottom most position may be referred to as a bottom dead center (BDC) position, where the piston 28 is closest to the open end 30 of the cylinder 12. During the compression stroke, the crankshaft drives the piston 28 toward a top most position, thereby compressing the air/fuel mixture within the cylinder 12. The top most position may be referred to as a top dead center (TDC) position. During an engine combustion cycle, the piston 28 travels between BDC and TDC a length d along the cylinder wall 19 to define a piston travel path.

In some variations, the strengthening layer/ring 22 is located entirely outside of the piston travel path adjacent to the open end 30 of the cylinder 12 on the upper portion 24 of the cylinder 12. Thus, the thermal spray coating 26 may extend farther into the cylinder bore 14 than the strengthening layer 22.

Each cylinder 12 may define a chamfer area 32 adjacent to the open end 30, and the strengthening layer/ring 22 may be disposed at a position overlapping with the chamfer area 32. For example, a bottom portion 34 of the chamfer area 32 overlaps with a top portion 36 of the strengthening layer along the height of the cylinder 12, in the example shown in FIG. 3.

An upper groove 38 may be formed in the upper portion 24 of the inner wall 19, and the strengthening layer 22 may be disposed within the inner groove 38, if desired.

The thermal spray coating 26 is formed on the inner surface 19 of each cylinder bore 14, wherein the thermal spray coating 26 is adhered to the inner surface 19 (including to the surface profile 20) and to the strengthening layer 22. Typically, the thermal spray coating 26 for the inner surface 19 described herein, after honing, may be on the order of about 150 µm and is typically within the range of from about 130 µm to about 175 µm. Some applications may require thermal spray coatings 26 having greater or lesser thicknesses, however. The thermal spray coating 26 may be a steel or a steel alloy, another metal or alloy, a ceramic, or any other thermal spray material suited for the service conditions of the product and may be applied by any one of the numerous thermal spray processes such as plasma, detonation, wire arc, flame, or HVOF suited to the substrate and material applied. The thermal spray coating 26 may form a durable bond with the strengthening layer 22, thus increasing the bond strength between the thermal spray coating 26 and the cylinder bore 14 as a whole.

Figure 6:
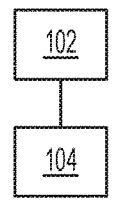
FIG. 6 is a block diagram illustrating a method of forming a coating on an inner surface of an engine cylinder bore, according to the principles of the present disclosure.

Referring now to FIG. 6, a method of coating an inner surface of an engine cylinder bore is illustrated and generally designated at 100. In a step 102, the method 100 includes attaching a strengthening layer onto an upper portion of the inner surface of the cylinder bore. The method 100 then includes a step 104 of depositing a thermal spray coating onto the inner surface of the cylinder bore such that a substantial entirety of a piston travel path on the inner surface is covered by the thermal spray coating.

The method 100 may optionally include attaching the strengthening layer to the inner surface by laser cladding. In some forms, the thermal spray coating extends farther into the engine cylinder bore than the strengthening layer. The method 100 may also include forming the strengthening layer from a nickel alloy containing a majority of nickel, or from another alloy such as a copper or steel alloy. The method 100 may further include attaching the strengthening layer entirely outside of the piston travel path at an open end of the engine cylinder.

In addition, the method 100 may optionally include providing the strengthening layer having a thickness in the range of about 0.1 mm to about 0.4 mm and a height in the range of about 5 to about 50 mm. Further, the method 100 may include disposing the strengthening layer at a position overlapping with a chamfer extending from the open end of the engine cylinder. In addition, the method 100 may include forming an upper groove in the upper portion of the inner surface of the cylinder bore and disposing the strengthening layer within the upper groove.

Figure 7:
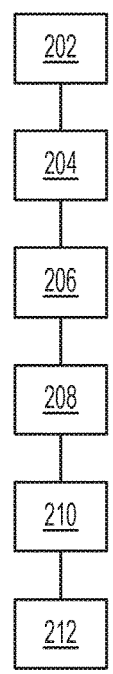
FIG. 7 is a block diagram illustrating another method of forming a coating on an inner surface of an engine cylinder bore, in accordance with the principles of the present disclosure.

Referring now to FIG. 7, and with continued reference to FIGS. 2-5, another variation of a method of coating an inner surface of an engine cylinder bore is illustrated and generally designated at 200. The method 200 is an example that includes several details, all of which are not required for the method 100 shown in FIG. 6.

The method 200 includes a step 202 of activating an inner surface 19 of an engine cylinder bore 14 to achieve better adhesion between a subsequently-applied coating 26 and the inner surface 19. For example, the step 202 may include machining grooves into or removing material from the inner surface 19 using a tool to remove material, to create a base surface profile.

The method 200 may include a step 204 of machining upper grooves 38 into an upper portion 24 of the inner surface 19, for placement of the strengthening layer 22. The method 200 may optionally include washing of the cylinder bores 14, for example, after machining the inner surface 19 in steps 202 and 204.

The method 200 includes a step 206 of laser cladding a strengthening layer/ring 22 in the upper grooves 38 in the inner surface 19. For example, step 206 may include using a laser beam to clad a high temperature alloy ring 22 (such as a nickel-based alloy, austenite stainless steel, or a copper alloy) onto the inner surface 19 of the cylinder bore 14 in the upper grooves 38.

The method 200 may include an optional step 208 of performing a secondary roughening procedure, such as water jetting or another mechanical operation, to complete the surface profile 20 along the length of the inner surface 19.

The method 200 then includes a step 210 of thermal spraying, or depositing a thermal spray coating, on the inner surface 19. The step 210 includes thermal spraying a coating, such as a steel coating, over the surface profile 20 and the cladded areas (the ring 22).

The method 200 may also include a step 212 of machining the resultant bore surface (on an exposed side 40 of the thermal spray) to meet dimension and surface finish desires and requirements.

In some variations, the thermal spray coating 26 may extend farther into the cylinder bore 14 than the strengthening layer 22. In addition, the method 200 may optionally include providing the strengthening layer 22 having a thickness t in the range of about 0.1 mm to about 0.4 mm, and/or a height h in the range of about 5 to about 50 mm, or a height h in the range of about 10 to about 25 mm.

The method 200 may include attaching the strengthening layer 22 entirely outside of a piston travel path (between BDC and TDC) at an open end 30 of the cylinder 12. In some variations, the method 200 may include disposing the strengthening layer 22 at a position overlapping with a chamfer 32 extending from the open end 30 of the cylinder 22.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A method of coating an inner surface of an engine cylinder bore of an engine cylinder, the method comprising:
    laser cladding a strengthening layer onto an upper portion of the inner surface of the engine cylinder bore; and
    depositing a thermal spray coating onto the inner surface of the engine cylinder bore,
    the inner surface of the engine cylinder bore defining a piston travel path, the method further comprising attaching the strengthening layer entirely outside of the piston travel path at an open end of the engine cylinder, the method further comprising depositing the thermal spray coating onto the strengthening layer,
    the method further comprising forming the strengthening layer from at least one of the following: a nickel alloy, a copper alloy, and a steel alloy, and
    the method further comprising providing the strengthening layer having a thickness in the range of 0.1 mm to about 0.4 mm.

2. The method of claim 1, further comprising providing the strengthening layer having a height in the range of 5 to about 50 mm.

3. The method of claim 2, further comprising disposing the strengthening layer at a position overlapping with a chamfer extending from the open end of the engine cylinder.

4. The method of claim 3, further comprising forming an upper groove in the upper portion of the inner surface and disposing the strengthening layer within the upper groove.

5. A method of coating an inner surface of an engine cylinder bore of an engine cylinder, the method comprising:
- attaching a strengthening layer onto an upper portion of the inner surface of the engine cylinder bore;
- depositing a thermal spray coating onto the inner surface of the engine cylinder bore, the thermal spray coating extending farther into the engine cylinder bore than the strengthening layer;
- forming the strengthening layer from at least one of the following: a nickel alloy, a copper alloy, and a steel alloy;
- attaching the strengthening layer entirely outside of the piston travel path at an open end of the engine cylinder;
- providing the strengthening layer having a thickness in the range of 0.1 mm to about 0.4 mm;
- providing the strengthening layer having a height in the range of about 5 to about 50 mm;
- forming an upper groove in the upper portion of the inner surface and disposing the strengthening layer within the upper groove;
- forming the strengthening layer by laser cladding; and
- depositing the thermal spray coating onto the strengthening layer.

6. The method of claim 5, further comprising disposing the strengthening layer at a position overlapping with a chamfer extending from the open end of the engine cylinder.

7. An engine block comprising:
- a plurality of cylinders defining a plurality of cylinder bores, each cylinder bore having an inner surface, each inner surface having a strengthening ring laser clad onto an upper portion of the inner surface;
- a thermal spray coating formed on the inner surface of each cylinder bore, the thermal spray coating being adhered to the inner surface and to the strengthening ring, each strengthening ring being disposed entirely outside of a piston travel path at an open end of each cylinder of the plurality of cylinders, wherein the engine block is formed of aluminum, the thermal spray coating is formed of a steel alloy, and the strengthening ring is formed of at least one of the following: a nickel alloy, a copper alloy, and a steel alloy; and
- a plurality of pistons, each piston being moveable in a piston travel path along the inner surface of a cylinder bore of the plurality of cylinder bores,
- wherein each strengthening ring has a thickness in the range of 0.1 mm to about 0.4 mm and a height in the range of about 5 to about 50 mm.

8. The engine block of claim 7, each cylinder defining a chamfer area adjacent to the open end, the strengthening ring being disposed at a position overlapping with the chamfer area.

9. The engine block of claim 8, the upper portion forming an upper groove in the upper portion, the strengthening ring being disposed within the upper groove.

* * * * *